(12) United States Patent
Sasaki

(10) Patent No.: US 9,513,439 B2
(45) Date of Patent: Dec. 6, 2016

(54) OPTICAL FIBER FUSION SPLICER AND OPTICAL FIBER FUSION SPLICING APPARATUS PROVIDED WITH SAME

(71) Applicant: FUJIKURA LTD., Tokyo (JP)

(72) Inventor: Katsumi Sasaki, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/631,493

(22) Filed: Feb. 25, 2015

(65) Prior Publication Data

US 2016/0116675 A1  Apr. 28, 2016

(30) Foreign Application Priority Data

Oct. 24, 2014  (JP) ................. 2014-217246

(51) Int. Cl.
*G02B 6/255* (2006.01)
*G02B 6/38* (2006.01)

(52) U.S. Cl.
CPC .......... *G02B 6/2553* (2013.01); *G02B 6/2557* (2013.01); *G02B 6/2551* (2013.01)

(58) Field of Classification Search
CPC ... G02B 6/2551; G02B 6/2553; G02B 6/3846; G02B 6/2555; G02B 6/3887; G02B 6/3806; G02B 6/3803; G02B 6/3821; G02B 6/3833; G02B 6/3882; G02B 6/4226; G02B 6/3805
See application file for complete search history.

(56) References Cited

U.S. PATENT DOCUMENTS

| | | | |
|---|---|---|---|
| 4,914,797 A | 4/1990 | Tsuchida et al. | |
| 5,168,617 A | 12/1992 | Tsuchida et al. | |
| 5,561,728 A | 10/1996 | Kobayashi et al. | |
| 2013/0236145 A1* | 9/2013 | Sato | G02B 6/2555 385/96 |

(Continued)

FOREIGN PATENT DOCUMENTS

| | | |
|---|---|---|
| JP | 56161915 U | 12/1981 |
| JP | 58-67306 U | 5/1983 |

(Continued)

OTHER PUBLICATIONS

Communication dated Jun. 2, 2015, issued by the Japanese Patent Office in counterpart Japanese application No. 2014-217246.

(Continued)

*Primary Examiner* — Jodi C Franklin
(74) *Attorney, Agent, or Firm* — Sughrue Mion, PLLC

(57) ABSTRACT

An optical fiber fusion splicer includes: a pair of right and left V-grooved stands having V-grooves for butting tips of a pair of optical fibers each other while positioning the tips of a pair of optical fibers; a pair of elastic members respectively supporting the pair of V-grooved stands and formed into the form of an elastically deformable plate; a fixed base on which the pair of elastic members is mounted, whereby the pair of V-grooved stands is fixed thereto through the pair of elastic members, and which is long in a right-left direction; and a pair of micrometers aligning the tips of the pair of optical fibers by finely moving the pair of V-grooved stands with respect to each other while elastically deforming the pair of elastic members by pressing the pair of V-grooved stands from forward and backward directions.

10 Claims, 11 Drawing Sheets

(56) References Cited

U.S. PATENT DOCUMENTS

2014/0102642 A1    4/2014  Zhao et al.

FOREIGN PATENT DOCUMENTS

| | | |
|---|---|---|
| JP | 6187110 A | 5/1986 |
| JP | 63-108307 A | 5/1988 |
| JP | 7-43548 A | 2/1995 |
| JP | 8-062446 A | 3/1996 |
| JP | 8062446 A | 3/1996 |
| JP | 3122559 B2 | 1/2001 |
| JP | 2004354636 A | 12/2004 |

OTHER PUBLICATIONS

Communication dated Nov. 24, 2015, issued by the Korean Intellectual Property Office in corresponding Korean Application No. 10-2015-0025306.
Communication dated Jan. 4, 2016 from the European Patent Office issued in corresponding Application No. 15156192.5.
Communication dated Jan. 20, 2015 from the Japanese Patent Office in counterpart application No. 2014-217246.

* cited by examiner

OPTICAL FIBER FUSION SPLICER AND OPTICAL FIBER FUSION SPLICING APPARATUS PROVIDED WITH SAME

CROSS REFERENCE TO RELATED APPLICATIONS

Priority is claimed on Japanese Patent Application No. 2014-217246, filed on Oct. 24, 2014, the content of which is incorporated herein by reference.

BACKGROUND OF THE INVENTION

Field of the Invention

The present invention relates to an optical fiber fusion splicer and an optical fiber fusion splicing apparatus which is provided with the optical fiber fusion splicer.

Description of Related Art

When performing a fusion splice of an optical fiber, in general, the fusion splice is performed in the following procedure by using an optical fiber fusion splicing apparatus.

(1) An optical fiber core wire is extracted from an optical fiber cable.

(2) A resin coating (a tip) covering the extracted optical fiber core wire is removed by an optical fiber coating removal tool.

(3) Resin coating debris remaining on the surface of glass (a bare optical fiber) of the optical fiber core wire with the coating of the tip removed therefrom is removed with a cloth or paper wetted with alcohol.

(4) The optical fiber core wire which has been cleaned is cut by an optical fiber cutter.

(5) The cut optical fiber core wires are fusion-spliced by the optical fiber fusion splicing apparatus.

(6) The fusion-spliced optical fiber core wire is covered with a heat-shrinkable reinforcement sleeve and heated and reinforced by a heater of the fusion splicing apparatus.

(7) The heated and reinforced optical fiber core wire is stored in a storage tray of a connection portion storage case.

As an optical fiber fusion splicer which is used in the process (5) described above, for example, a device (a single-core machine) for fusion-splicing a pair of single-core optical fibers by discharge heating between a pair of electrode rods, or a device (a multi-core machine) for fusion-splicing end portions of a pair of multi-core optical fibers (a tape fiber) together by discharge heating between a pair of electrode rods is provided.

In the related art, as an optical fiber fusion splicer which is used for a single-core optical fiber, for example, an optical fiber fusion splicer having a function and a configuration as shown in FIG. 8 and described below is widely used.

(a) A pair of optical fibers (not shown) is illuminated with one or two illumination lamps for observation from one direction or two directions and the optical fibers are observed in one axis or two axes from the each direction by one or two lenses for observation (not shown) or one or two cameras (not shown).

(b) Glass portions (core wires) of the pair of optical fibers with coatings removed therefrom are disposed on a pair of V-grooves 121 and gripped by a pair of fiber clamps 106A and 106B for pressing the pair of optical fibers against the V-grooves 121 from above.

(c) The fiber clamps 106A and 106B for gripping coating portions of the pair of right and left optical fibers, which are movable in a longitudinal direction of the pair of optical fibers, or easily detachable fiber holders (not shown) are disposed one for each of the right and the left.

(d) A windshield cover 111 has a structure of covering a pair of electrode rods 115A and 115B, the V-grooves 121, and the fiber clamps 106A and 106B or the easily detachable fiber holders (not shown) and preventing wind from the outside from reaching the periphery of an electrode.

When fusion-splicing right and left optical fibers which are paired, by using an optical fiber fusion splicing apparatus 100 of the related art as shown in FIG. 8, in order to reduce a transmission loss of a connection portion, alignment is performed so as to precisely match the axes of the optical fibers, and thereafter, the optical fibers are advanced and fused. At this time, an operation to align the axes of the optical fibers can be performed by making tips 91a of core wires 91 of a pair of optical fibers 90A and 90B face each other with a predetermined end face distance therebetween, as shown in FIG. 3, and then finely moving the optical fibers 90A and 90B in an X-axis direction or a Y-axis direction.

As a mechanism which is used for the alignment of the optical fibers, as described above, for example, a fusion splicer 101 which is provided with an elastic alignment mechanism having an elastically deformable elastic member, as shown in FIGS. 9 and 10, is proposed. In the fusion splicer 101 shown in FIGS. 9 and 10, two plate-shaped elastic members 103A are disposed so as to extend obliquely upward from the right side of a fixed base 104 in FIG. 9, and the tips thereof are connected to a V-grooved stand 102A with a V-groove 121 provided therein. Further, similar to the above, two elastic members 103B are disposed so as to extend obliquely upward from the left side of a fixed base 104 in FIG. 9 and the tips thereof are connected to a V-grooved stand 102B with the V-groove 121 provided therein. Further, the elastic members 103A and 103B are configured so as to extend to be inclined so as to face the center in a width direction of the fixed base 104, from the front and the back in a longitudinal direction (the right-left direction when viewed from the front side of the optical fiber fusion splicing apparatus 100 shown in FIG. 8) of the fixed base 104. In this manner, the fusion splicer 101 shown in FIGS. 9 and 10 has a structure in which right and left aligning structures are integrated with each other through the fixed base 104.

Further, the elastic members 103A and 103B shown in FIGS. 9 and 10 are disposed such that two elastic members of each of the elastic members 103A and 103B are parallel to each other and the elastic members 103A and the elastic members 103B are orthogonal to each other. In this manner, the two elastic members of each of the elastic members 103A and 103B are parallel to each other, and therefore, when the elastic members 103A and 103B are elastically deformed, a pair of optical fibers guided to the V-grooves 121 of the pair of V-grooved stands 102A and 102B connected to the tips moves substantially in parallel. Further, the right and left elastic members 103A and 103B are disposed so as to be orthogonal to each other, and therefore, the movements in the X direction and the Y direction of the pair of optical fibers 90A and 90B as shown in FIG. 3 are also orthogonal to each other.

Then, in the fusion splicer 101 shown in FIGS. 9 and 10, the alignment of the tips 91a of the pair of optical fibers 90A and 90B shown in FIG. 3 is performed by finely moving the V-grooves 121 provided in the V-grooved stands 102A and 102B by elastically deforming the pair of elastic members 103A and 103B by respectively pressing the pair of V-grooved stands 102A and 102B by a pair of micrometers 105A and 105B. Further, in the fusion splicer 101 of the related art shown in FIGS. 9 and 10, a configuration is made such that a distance A between connection portions of the pair of elastic members 103A and 103B to the V-grooved stands 102A and 102B is narrower than a distance B between connection portions of the pair of elastic members 103A and 103B to the fixed base 104. Here, in FIG. 10, each of the distances A and B indicates, in the pair of elastic members 103A and 103B each having two plate-shaped members provided parallel to each other, a distance between the intermediate positions between joined portions of the two plate-shaped members.

Here, as a structure to align the tips of a pair of optical fibers in fusion-splicing the tips, a fusion splicer as described in Japanese Unexamined Utility Model Application, First Publication No. S58-67306 is proposed. In an elastic alignment mechanism described in the above publication, right and left elastic members each made of one piece are disposed in directions orthogonal to each other. Further, in the above publication, a configuration is made in which the distance between connection base portions of the elastic members to V-grooved stands is narrower than the distance between connection base portions of the elastic members to an L-shaped fixed base.

Further, as a structure to align the tips of a pair of optical fibers, a fusion splicer as described in Japanese Unexamined Patent Application, First Publication No. S63-108307 is proposed. An elastic alignment mechanism described in the above publication has a configuration in which the distance between connection portions of elastic members to a fixed base is larger than the distance between connection portions of the elastic members to V-grooved stands.

In addition, as a structure to align the tips of a pair of optical fibers, a fusion splicer as described in Japanese Unexamined Patent Application, First Publication No. H08-62446 is proposed. In an elastic alignment mechanism described in the above publication, right and left elastic members each made of one piece are disposed in directions orthogonal to each other. Further, in the above publication, a configuration is made in which the distance between connection portions of the elastic members to V-grooved stands is narrower than the distance between connection portions of the elastic members to a fixed base.

However, in the fusion splicer 101 of the related art as shown in FIGS. 9 and 10, for example, when the elastic members 103A are deformed by pressing by the micrometer 105A, since the distance B between the connection portions of the pair of elastic members 103A and 103B to the fixed base 104 is large, if the rigidity of the fixed base 104 made of a resin molding product or the like is low, distortion occurs in the fixed base 104, and thus there is a concern that the elastic alignment mechanism may break down or alignment accuracy may be reduced.

In addition, also in the fusion splicer which is provided with the elastic alignment mechanism described in each of Japanese Unexamined Utility Model Application, First Publication No. S58-67306, Japanese Unexamined Patent Application, First Publication No. S63-108307, and Japanese Unexamined Patent Application, First Publication No. H08-62446, similar to the above, the distance between the connection portions of the elastic members to the fixed base is large, and therefore, in a case where the rigidity of the fixed base is low, the same problem occurs.

Moreover, in the case of the fusion splicer 101 shown in FIGS. 9 and 10, as described above, the distance B between the connection portions of the pair of elastic members 103A and 103B to the fixed base 104 is larger than the distance A between the connection portions of the pair of elastic members 103A and 103B to the V-grooved stands 102A and 102B, and therefore, there is a problem in that the size of the fixed base 104 is increased and the weight is also increased. Further, also in the fusion splicer described in each of Japanese Unexamined Utility Model Application, First Publication No. S58-67306, Japanese Unexamined Patent Application, First Publication No. S63-108307, and Japanese Unexamined Patent Application, First Publication No. H08-62446, similar to the above, the distance between the connection portions of the elastic members to the fixed base is large, and therefore, there is the same problem in that the size of the fixed base 104 is increased and the weight is also increased.

Furthermore, in the fusion splicer 101 shown in FIGS. 9 and 10, in order to avoid lenses for observation 109 (not shown) which are disposed in the front and the back of the fusion splicer 101, and guides (not shown) which are disposed in a pair on the right and left sides, whereby the fiber clamps 106A and 106B (refer to FIG. 8) are driven forward, the pair of V-grooved stands 102A and 102B is configured so as to extend up and down (refer to a height C shown in FIG. 9), and the elastic members 103A and 103B are provided to extend toward the fixed base 104 from the V-grooved stands 102A and 102B. For this reason, in the fusion splicer of the related art, there is a problem in that the height of the entire mechanism is increased. Further, also in the fusion splicer described in Japanese Unexamined Patent Application, First Publication No. H08-62446, the elastic member on one side is disposed just below the V-grooved stand, and therefore, similar to the above, there is a problem in that the height of the entire mechanism is increased.

In addition, in the configuration of the fusion splicer of the related art, the connection portions of the elastic members 103A and 103B to the V-grooved stands 102A and 102B are disposed in the vicinity of a fusion splicing portion between the optical fibers, and therefore, there is a case where the pair of elastic members 103A and 103B interferes with the pair of fiber clamps 106A and 106B (refer to FIG. 8) or drive stages (not shown) for driving forward the fiber clamps 106A and 106B. In order to avoid such interference, it is necessary to dispose the V-grooves 121 on the upper side and dispose the elastic members 103A and 103B on the lower side of an apparatus. For this reason, a drive mechanism such as the micrometer 105A for elastically deforming the pair of elastic members 103A and 103B is disposed on the lower side of the apparatus, and therefore, there is a problem in that it is difficult to perform maintenance work from above the apparatus.

The present invention has been made in view of the above circumstances and provides an optical fiber fusion splicer in which it is possible to reduce the size and the weight of the entire elastic alignment mechanism such as a V-grooved stand or a fixed base while suppressing occurrence of distortion in the fixed base to which an elastic member is connected, and maintenance work is easy, and an optical fiber fusion splicing apparatus using the optical fiber fusion splicer.

SUMMARY OF THE INVENTION

The first aspect of the present invention is an optical fiber fusion splicer which aligns tips of a pair of optical fibers and butts the tips each other, and fusion-splices core wires of the pair of optical fibers by discharge heating. The optical fiber fusion splicer includes: a pair of right and left V-grooved stands having V-grooves for butting the tips of the pair of optical fibers each other while positioning the tips of the pair of optical fibers; a pair of elastic members respectively supporting the pair of V-grooved stands and formed into an elastically deformable plate; a fixed base on which the pair of elastic members is mounted, whereby the pair of V-grooved stands is fixed thereto through the pair of elastic members, and which is long in a right-left direction; and a pair of micrometers aligning the tips of the pair of optical fibers by finely moving the pair of V-grooved stands with respect to each other while elastically deforming the pair of elastic members by pressing the pair of V-grooved stands from forward and backward directions, where the pair of elastic members is provided so as to extend upward from fixing base portions of the fixed base while being respectively inclined in the forward and backward directions, and is disposed at positions shifted in the right-left direction of the fixed base, the pair of V-grooved stands is disposed such that the V-grooves provided therein communicate with each other, and when viewed from the right and left end portions of the fixed base, a distance L1 between first end portions of the pair of elastic members fixed to the fixing base portions is narrower than a distance L2 between second end portions of the pair of elastic members on which the pair of V-grooved stands is mounted.

The second aspect of the present invention is an optical fiber fusion splicer which aligns tips of a pair of optical fibers and butts the tips each other, and fusion-splices core wires of the pair of optical fibers by discharge heating. The optical fiber fusion splicer includes: a pair of right and left V-grooved stands having V-grooves for butting the tips of the pair of optical fibers each other while positioning the tips of the pair of optical fibers; a pair of elastic members respectively supporting the pair of V-grooved stands and formed into an elastically deformable plate; a fixed base on which the pair of elastic members is mounted, whereby the pair of V-grooved stands is fixed thereto through the pair of elastic members, and which is long in a right-left direction; and a pair of micrometers for aligning the tips of the pair of optical fibers by finely moving the pair of V-grooved stands with respect to each other while elastically deforming the pair of elastic members by pressing the pair of V-grooved stands from forward and backward directions, where the fixed base is provided with a pair of fixing base portions disposed parallel to each other in the right-left direction, the pair of elastic members is provided so as to extend upward from the pair of fixing base portions provided in the fixed base, while intersecting each other and being inclined in forward and backward directions, and is disposed at positions shifted in the right-left direction of the fixed base, the pair of V-grooved stands is disposed such that the V-grooves provided therein communicate with each other, and when viewed from the right and left end portions of the fixed base, a distance L1 between first end portions of the pair of elastic members fixed to the pair of fixing base portions is narrower than a distance L2 between second end portions of the pair of elastic members on which the pair of V-grooved stands is mounted.

The third aspect of the present invention is that, in the optical fiber fusion splicer according to the first or second aspect, the pair of elastic members may be fixed to the fixed base with the elastic members inclined in directions orthogonal to each other.

The fourth aspect of the present invention is that, in the optical fiber fusion splicer according to any one of the first to third aspects, the optical fiber fusion splicer may further include: a top base section which is provided so as to cover at least part of the pair of V-grooved stands, the pair of elastic members, the fixed base, and the micrometers from above; a pair of fiber clamps which is mounted on the top base section, disposed to be separated from each other with the tips of the pair of optical fibers interposed therebetween in the right-left direction, and provided so as to be able to move in the right-left direction with gripping each of the pair of optical fibers; a pair of movable stages which is provided below the pair of fiber clamps and makes the pair of fiber clamps approach each other or be separated from each other in the right-left direction; a pair of illumination lamps for observation which is disposed on both sides of the tips of the pair of optical fibers which are butt each other between the pair of fiber clamps on an upper side of the top base section, and emits observation light toward the tips; a pair of lenses for observation which is mounted on the fixed base so as to be disposed to face the pair of illumination lamps for observation on both sides of the tips of the pair of optical fibers which is butt each other between the pair of fiber clamps on the lower side of the top base section, and detects an alignment state of the tips of the pair of optical fibers brought into contact with each other, by incident light from the illumination lamps for observation; and a pair of electrode rods which is disposed to be separated from each other so as to face each other on both sides of the tips of the pair of optical fibers which are butt each other between the pair of fiber clamps, and discharge-heats the tips of the pair of optical fibers, wherein the fixed base may be fixed to a mounting boss provided so as to protrude downward from the top base section.

The fifth aspect of the present invention is that, in the optical fiber fusion splicer according to the fourth aspect, the pair of movable stages may be disposed above the fixed base so as to be respectively separated from the pair of V-grooved stands disposed at positions shifted in the right-left direction of the fixed base.

The sixth aspect of the present invention is an optical fiber fusion splicing apparatus including the optical fiber fusion splicer according to any one of the first to fifth aspects.

According to the above aspects of the present invention, the distance L1 between one end portions of the pair of elastic members in the fixed base is configured to be short, whereby it becomes possible to reduce the size of the fixed base, and therefore, it is possible to suppress occurrence of distortion in the fixed base. In this manner, breakage of the optical fiber fusion splicer or a decrease in alignment accuracy of the optical fibers can be prevented and it becomes possible to attain a reduction in the size and the weight of the entire optical fiber fusion splicing apparatus.

In addition, the pair of elastic members is fixed so as to extend upward from the fixed base while being respectively inclined in the forward and backward directions and is disposed at positions shifted in the right-left direction and a connection portion of the V-grooved stand to the elastic member is disposed at a position away from a fusion splicing portion in which the tips of the pair of optical fibers are brought into contact with each other, and therefore, there is no interference with the right and left fiber clamps, the movable stages driving forward the fiber clamps, or the like. In this manner, it is not necessary to increase the height of the V-grooved stand, and thus it becomes possible to reduce the height of the optical fiber fusion splicer. Therefore, a reduction in the size and the weight of the entire optical fiber fusion splicing apparatus becomes possible.

Furthermore, the pair of elastic members is fixed so as to extend upward while being inclined in the forward and backward directions and is disposed at positions shifted in the right-left direction, and therefore, drive mechanisms such as the micrometers for elastically deforming the elastic members can be disposed on the upper side, backward and forward away from a fusion splicing portion. Therefore, it becomes easy to perform maintenance work of the drive mechanisms from above the optical fiber fusion splicing apparatus, and thus maintainability is improved.

DETAILED DESCRIPTION OF THE PREFERRED EMBODIMENTS

Hereinafter, preferred embodiments of an optical fiber fusion splicer according to the present invention and an optical fiber fusion splicing apparatus in which the optical fiber fusion splicer is used are cited, and each configuration will be described in detail appropriately referring to FIGS. 1 to 7 (as necessary, FIGS. 8 to 11 showing the related art are also referred to). In the following description, first, an outline of the entire optical fiber fusion splicing apparatus will be described, and thereafter, details of the optical fiber fusion splicer (an elastic alignment mechanism) with which the optical fiber fusion splicing apparatus is provided will be described.

Optical Fiber Fusion Splicing Apparatus

The optical fiber fusion splicing apparatus according to the present invention is provided with an optical fiber fusion splicer (hereinafter, sometimes referred to simply as a fusion splicer) 1 which performs fusion splicing of, for example, an optical fiber, and an optical fiber connection portion reinforcing heater (not shown) for heating and shrinking a sleeve for reinforcement covered on the optical fiber after the fusion splice. Further, the optical fiber fusion splicing apparatus of the present embodiment is provided with a display device (not shown) for displaying a variety of information or the like for a worker, an operation section which is used for condition setting or the like, and the like, in addition to the fusion splicer 1 and the optical fiber connection portion reinforcing heater. In addition, the optical fiber fusion splicing apparatus is configured by disposing, in an approximately cube-shaped main body section, a built-in device such as means for comprehensively driving the fusion splicer 1 and the optical fiber connection portion reinforcing heater, or a control section, in addition to the fusion splicer 1 and the optical fiber connection portion reinforcing heater. Further, the optical fiber fusion splicing apparatus has a plurality of leg portions at a lower portion of the main body section. As the display device, it is possible to adopt various display types such as a liquid crystal type, an organic EL type, or an electric light type.

Further, the optical fiber fusion splicing apparatus has a movable panel section provided on the front side of the main body section, and the display device or the operation section is disposed on the panel section. The panel section is connected to the main body section through a horizontal pivot shaft provided at an upper portion of the main body section, and a configuration is made in which the display device can be directed in an arbitrary direction within a predetermined angular range by moving the panel section. Further, a worker can move the panel section in a direction that is easy to see the display device.

Figure 8:
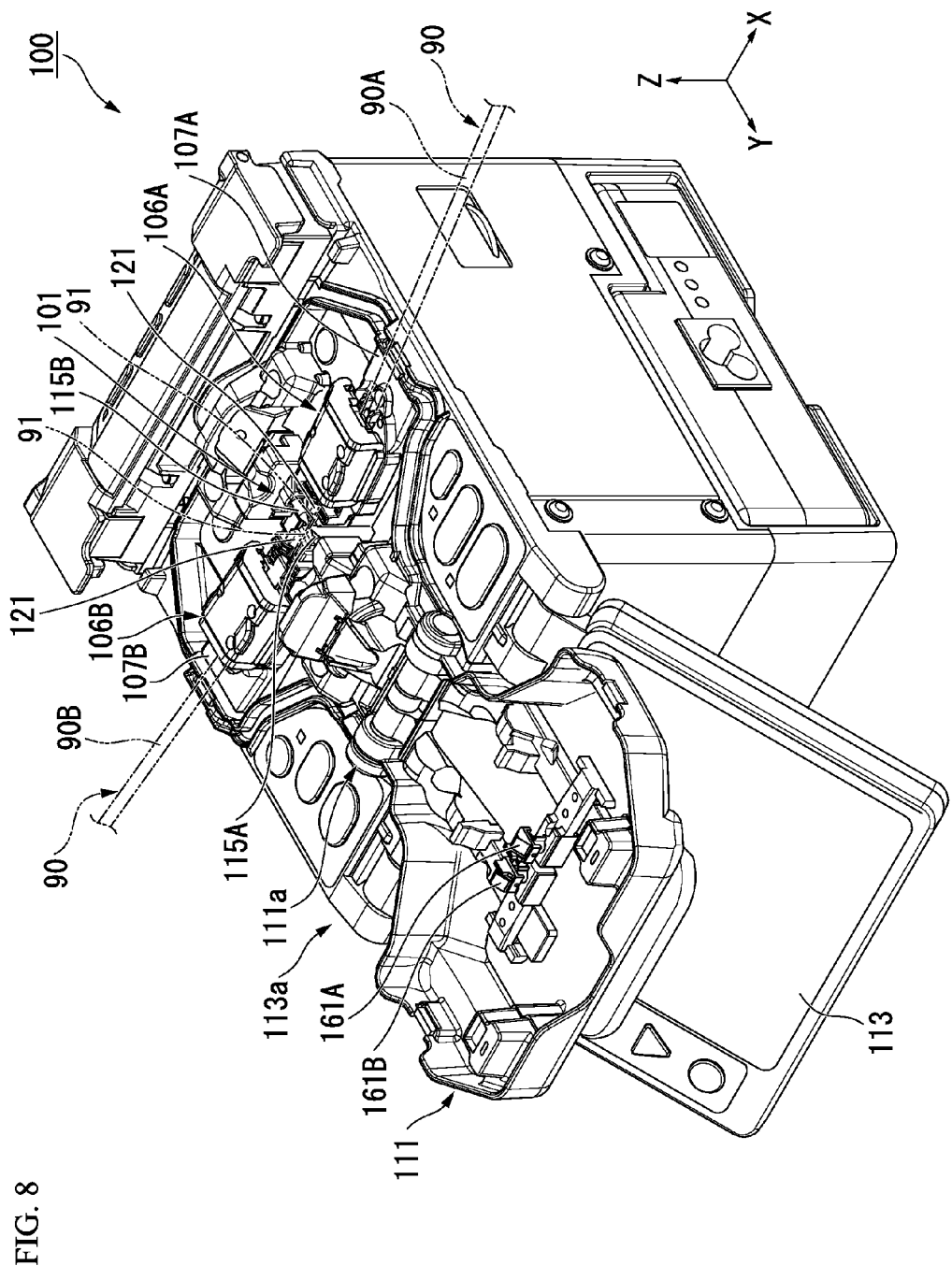
FIG. 8 is an external perspective view showing an example of an optical fiber fusion splicing apparatus of the related art.

In addition, in the optical fiber fusion splicing apparatus according to the present invention, similar to the optical fiber fusion splicing apparatus 100 of the related art shown in FIG. 8, the optical fiber connection portion reinforcing heater is disposed at a position on the back side in the optical fiber fusion splicing apparatus, and the fusion splicer 1 is disposed further to the front side than the optical fiber connection portion reinforcing heater. Here, with respect to the front, the back, the right, and the left in the present invention, the side (for example, the left side in FIG. 8 showing the related art) which a worker faces when the worker uses the optical fiber fusion splicing apparatus is set to be the front side, the back side (for example, the right side in FIG. 8) of the optical fiber fusion splicing apparatus when viewed from the worker is set to be the back side, and the right and the left of the worker are set to be the right and the left.

Optical Fiber

A Pair of Optical Fibers

Figure 3:
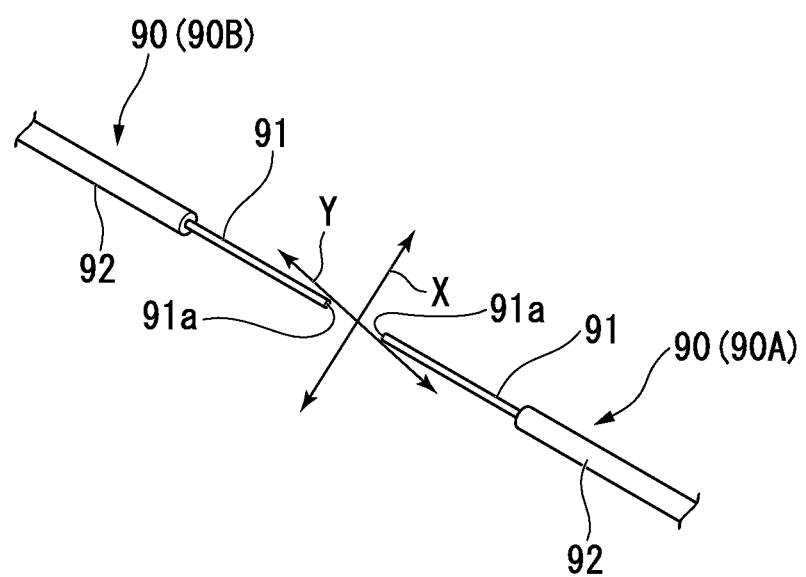
FIG. 3 is a perspective view showing a pair of optical fibers which is aligned by the optical fiber fusion splicer with which the optical fiber fusion splicing apparatus according to the embodiment of the present invention is provided.

As shown in FIG. 3, each of a pair of optical fibers 90 (90A and 90B) which is fusion-spliced by the fusion splicer 1 with which the optical fiber fusion splicing apparatus according to the present invention is provided is an optical fiber in which a core wire 91 made of glass is covered and integrated with a resin coating 92 made of a synthetic resin material. Further, in the pair of optical fibers 90A and 90B which are fusion-spliced, the resin coating 92 is removed in advance, whereby the vicinity of a tip 91a of each of the core wires 91 which are fusion-spliced is exposed. Further, although detailed illustration is omitted in FIG. 3, the core wire 91 is composed of a core of a central portion and a clad of a peripheral portion.

Further, although illustration is omitted, in the pair of optical fibers 90A and 90B, after the tips 91a are fusion-spliced, the connection portion is covered with a sleeve, and the sleeve is heated and shrunk by the optical fiber connection portion reinforcing heater described above, whereby the connection portion is reinforced.

Optical Fiber Fusion Splicer

Elastic Alignment Mechanism

First Embodiment

Hereinafter, an optical fiber fusion splicer of a first embodiment of the present invention will be described in detail using FIGS. 1 to 5. In addition, configurations which are not shown in FIGS. 1 to 5 are sometimes described while appropriately citing FIG. 8 which is the overall perspective view of an optical fiber fusion splicing apparatus of the related art, as necessary. Further, the drawings which are referred to in the present embodiment are sometimes appropriately used in other embodiments as well, and for example, even in a case where disposition positions or the like of configurations are different from each other in the embodiments, configurations having the same function are sometimes described with the same reference numerals applied thereto.

Further, each drawing which is referred to in the following description is for schematically describing the fusion splicer with which the optical fiber fusion splicing apparatus of the present embodiment is provided, and therefore, there is a case where a positional relationship in the right-left direction or the up-down direction in the drawing is different in the respective drawings.

Figure 1:
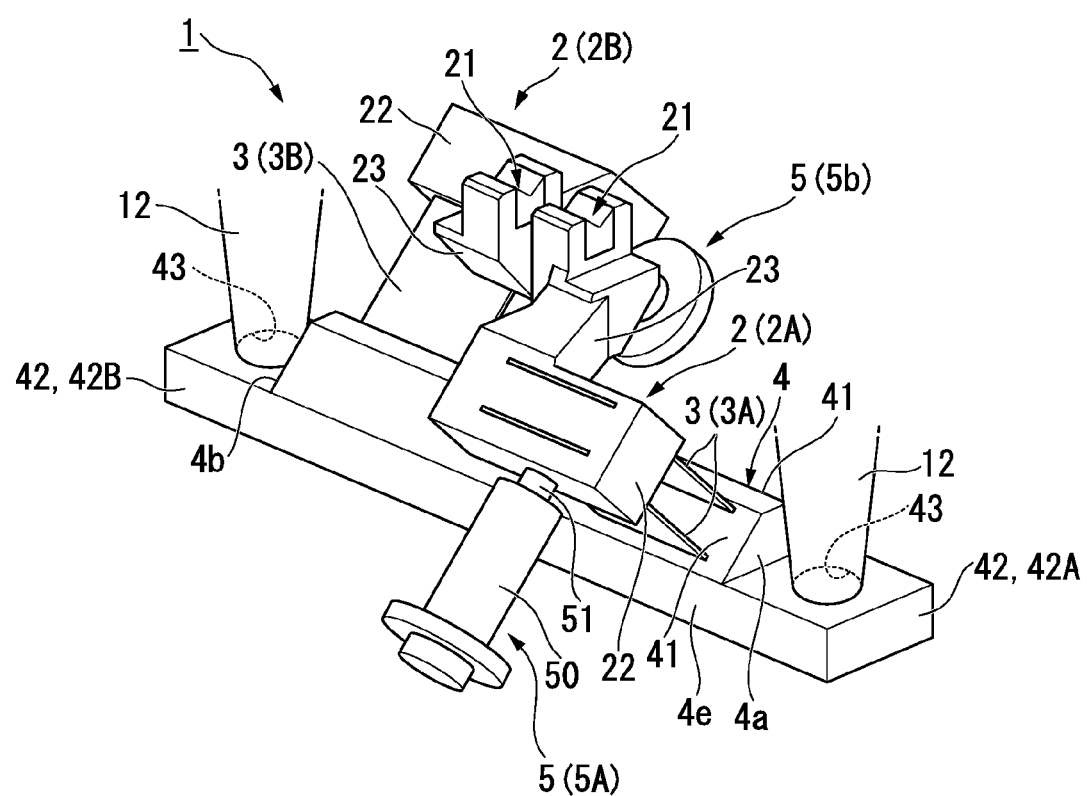
FIG. 1 is a perspective view showing an elastic alignment mechanism of an optical fiber fusion splicer with which an optical fiber fusion splicing apparatus according to an embodiment of the present invention is provided.
Figure 2:
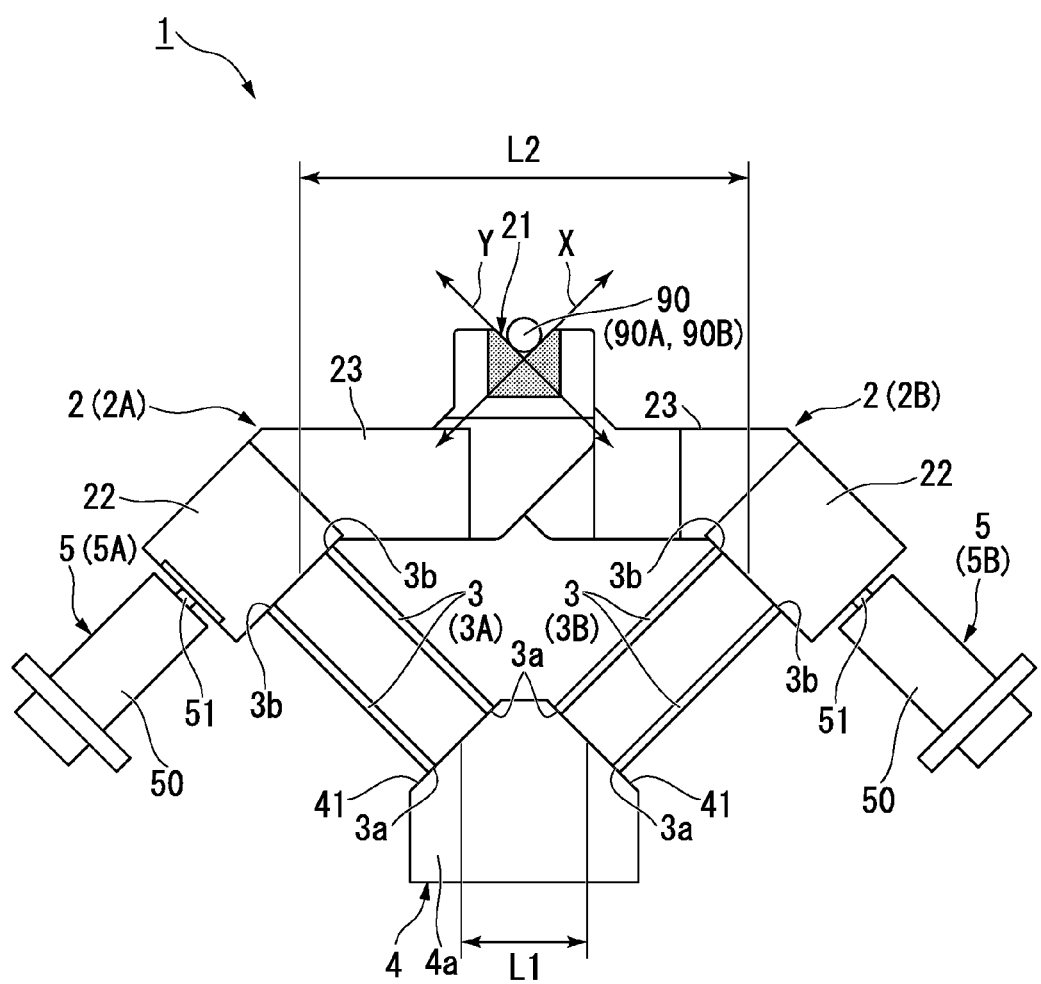
FIG. 2 is a side view showing the elastic alignment mechanism of the optical fiber fusion splicer with which the optical fiber fusion splicing apparatus according to the embodiment of the present invention is provided.

The fusion splicer 1 with which the optical fiber fusion splicing apparatus of the present embodiment is provided is for aligning the tips 91a of the pair of optical fibers 90 (90A and 90B), thereby bringing the tips 91a into contact with each other, and fusion-splicing the core wires 91 by discharge heating, as shown in FIGS. 1 and 2 (FIG. 3 is also referred to).

The fusion splicer 1 is provided with a pair of right and left V-grooved stands 2 (2A and 2B) having V-grooves 21 for performing the positioning of the pair of optical fibers 90A and 90B, a pair of elastic members 3 (3A and 3B) respectively supporting the pair of V-grooved stands 2A and 2B, a fixed base 4 to which the pair of V-grooved stands 2A and 2B is fixed through the pair of elastic members 3A and 3B, and a pair of micrometers 5 (5A and 5B) aligning the tips 91a of the pair of optical fibers 90A and 90B by pressing the pair of V-grooved stands 2A and 2B from forward and backward directions.

Figure 4A:
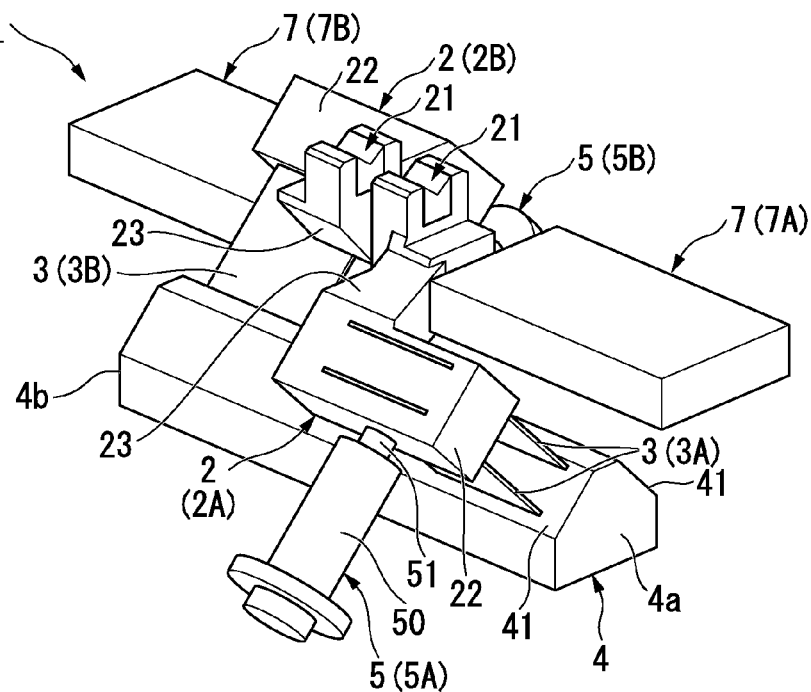
FIG. 4A is a perspective view showing the positional relationship between an elastic member, a V-grooved stand, and a movable stage in the elastic alignment mechanism of the optical fiber fusion splicer with which the optical fiber fusion splicing apparatus according to the embodiment of the present invention is provided.
Figure 4B:
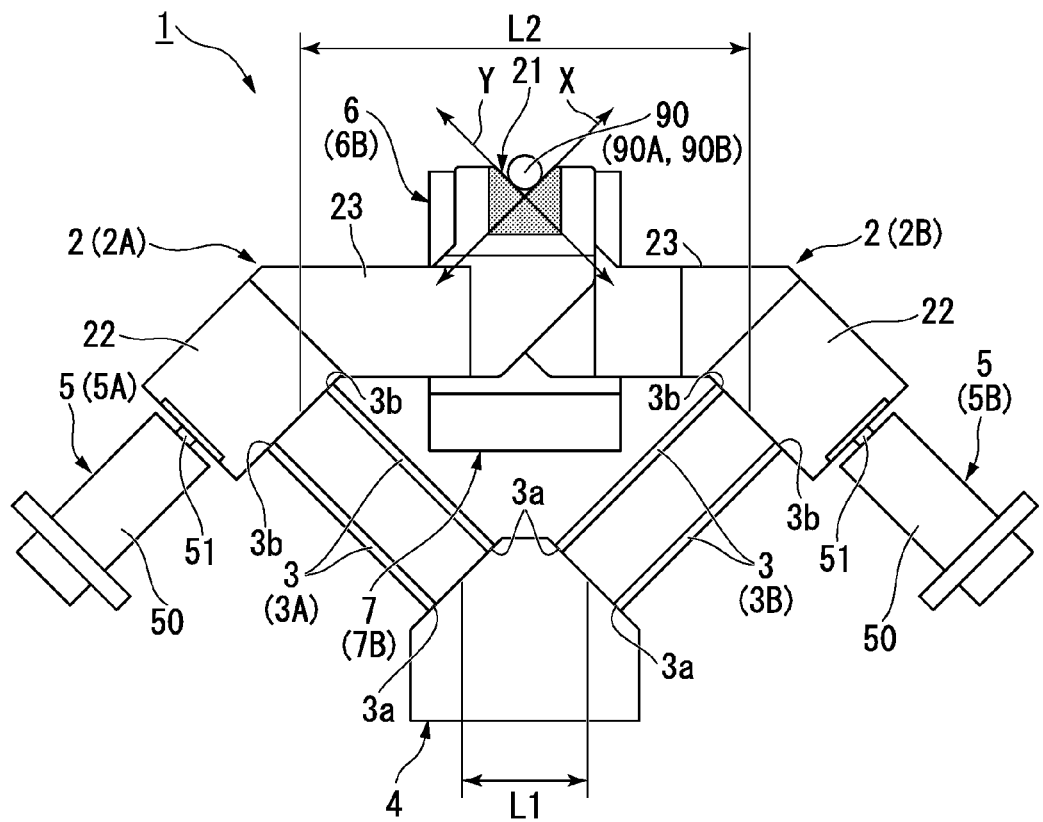
FIG. 4B is a side view showing the positional relationship between the elastic member, the V-grooved stand, and the movable stage in the elastic alignment mechanism of the optical fiber fusion splicer with which the optical fiber fusion splicing apparatus according to the embodiment of the present invention is provided.
Figure 5:
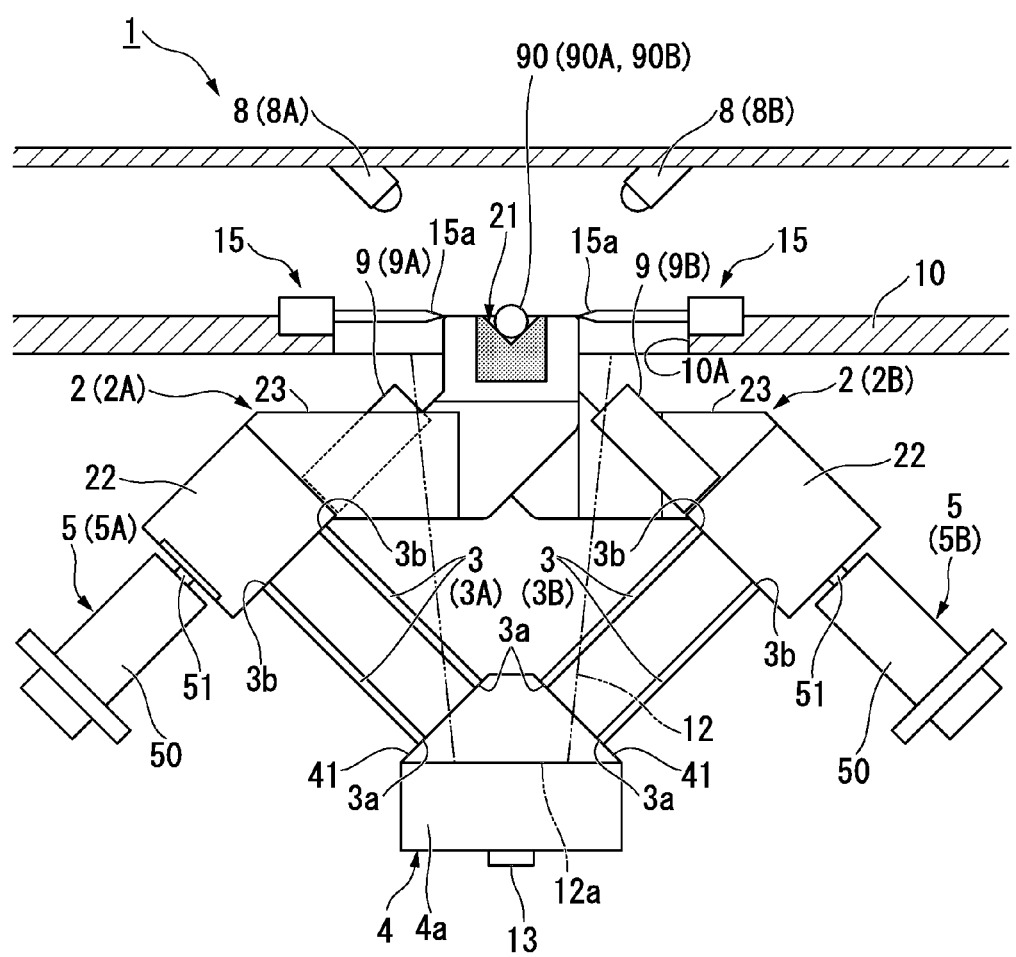
FIG. 5 is a diagram describing the elastic alignment mechanism of the optical fiber fusion splicer with which the optical fiber fusion splicing apparatus according to the embodiment of the present invention is provided, and is a side view describing the positional relationship and the mounting form of the elastic alignment mechanism provided below a top base section.

In addition, the fusion splicer 1 of the present embodiment is provided with a top base section 10 which covers at least a portion of the above-described elastic alignment mechanism from above, a pair of fiber clamps 6 (in FIG. 4B, only a fiber clamp 6B on one side is shown) which is provided so as to be able to move in the right-left direction with gripping each of the optical fibers, and a pair of movable stages 7 (7A and 7B) making the pair of fiber clamps 6 approach each other or be separated from each other in the right-left direction, as shown in FIGS. 4A, 4B, and 5.

Further, the fusion splicer 1 is provided with a pair of illumination lamps for observation 8 (8A and 8B) emitting observation light toward the tips 91a of the pair of optical fibers 90A and 90B, a pair of lenses for observation 9 (9A and 9B) which is disposed to face the pair of illumination lamps for observation 8A and 8B and detects an alignment state of the tips 91a of the pair of optical fibers 90A and 90B, and a pair of electrode rods 15 (15A and 15B) disposed so as to face each other on both sides of the tips 91a of the pair of optical fibers 90A and 90B.

In addition, in the fusion splicer 1, a pair of mounting portions 42 (42A and 42B) of the fixed base 4 configuring the above-described elastic alignment mechanism is fixed to mounting bosses 12 provided so as to protrude downward from the top base section 10, by bolts 13.

Further, in the fusion splicer 1, a lid portion 11 which performs opening and closing of the inside of the apparatus when setting the pair of optical fibers 90A and 90B is provided on the top base section 10. Further, clamp members (not shown) are provided on the inner surface side of the lid portion so as to correspond to the pair of optical fibers 90A and 90B. Then, the fusion splicer 1 is accommodated in a casing (not shown) (also refer to, for example, FIG. 8 showing the related art).

Hereinafter, each constituent element with which the fusion splicer 1 of the present embodiment is provided will be described in detail.

The pair of V-grooved stands 2A and 2B has the V-grooves 21 for bringing the tips 91a of the pair of optical fibers 90A and 90B into contact with each other while positioning the tips 91a, as described above, and is provided in a pair on the right and left, as shown in the perspective view of FIG. 1. Each of the V-grooved stands 2A and 2B is composed of a base portion 22 to which each of the elastic members 3A and 3B (details will be described later) is connected, and an arm portion 23 extending from the base portion 22, and the V-groove 21 is provided in the arm portion 23. Further, the pair of V-grooved stands 2A and 2B is disposed such that the V-grooves 21 provided therein communicate with each other.

The pair of optical fibers 90A and 90B as shown in FIG. 3 is accommodated and set in the V-grooves 21. In this manner, the optical fibers 90A and 90B are set in the V-grooves 21 having a shape cut into a V-shape, whereby the pair of optical fibers 90A and 90B enters a state of being able to appropriately move in the X direction and the Y direction shown by arrows in FIG. 2 (also refer to FIG. 3).

Each of the pair of elastic members 3A and 3B is a member formed into the form of an elastically deformable plate supporting each of the pair of V-grooved stands 2A and 2B having the above configuration, and in an example shown in FIG. 1 and the like, each of the elastic members 3A and 3B is composed of two plate-shaped members provided parallel to each other.

As a material of the elastic members 3A and 3B, an elastic material which has been used as a member in the relevant field in the past can be used without being limited in any way, and it is possible to adopt, for example, nickel silver or the like which is an alloy material composed of copper, zinc, and nickel.

As described above, the pair of elastic members 3A and 3B is mounted on the fixed base 4, whereby the pair of V-grooved stands 2A and 2B is fixed to the fixed base 4 through the pair of elastic members 3A and 3B, and thus the fixed base 4 functions as a base configuring the elastic alignment mechanism which is described in the present embodiment. The fixed base 4 shown in FIGS. 1 and 2 and the like is long in the right-left direction, and when viewed from the right and left end portions 4a and 4b, a lower surface 4c and an upper surface 4d are formed substantially parallel to each other, both side surfaces 4e and 4f are formed substantially parallel to each other, and inclined surfaces are formed so as to be reduced toward the upper surface 4d from both side surfaces 4e and 4f in a width direction, whereby the fixed base 4 is formed so as to have a substantially hexagonal cross-sectional shape. Then, the above-described inclined surfaces serve as fixing base portions 41 to which one end portions 3a and 3a of the pair of elastic members 3A and 3B are connected, and for example, the pair of elastic members 3A and 3B is connected thereto by a method such as integral molding. Further, due to the above configuration, each of the pair of elastic members 3A and 3B has a structure integrated through the fixed base 4.

Further, as shown in FIG. 1, at each of the right and left end portions 4a and 4b of the fixed base 4, the pair of mounting portions 42 (42A and 42B) for mounting the fixed base 4 on the top base section 10 is provided so as to protrude in a flat plate shape (in FIGS. 4A and 4B, for convenience of description, illustration of the pair of mounting portions 42A and 42B is omitted). A through-hole 43 is formed in each of the pair of mounting portions 42A and 42B. Then, as shown in FIG. 5, a configuration is made in which the fixed base 4 can be mounted so as to be suspended from the top base section 10 by inserting the bolt 13 into the through-hole 43 (refer to FIG. 1) and screwing the bolt 13 into a bolt mounting hole (not shown) formed in a tip face 12a of the mounting boss 12.

Here, in the fusion splicer 1 of the present embodiment, the pair of elastic members 3A and 3B is provided so as to extend upward from the fixing base portions 41 of the fixed base 4 while being respectively inclined in the forward and backward directions, that is, so as to be orthogonal to a longitudinal direction of the pair of optical fibers 90A and 90B, and with two elastic members of each of the pair of elastic members 3A and 3B being parallel to each other. In addition, the pair of elastic members 3A and 3B is disposed at the fixing base portions 41 of the fixed base 4 at positions shifted in the right-left direction of the fixed base 4 and is disposed such that the pair of elastic members 3A and 3B and the pair of V-grooved stands 2A and 2B connected to the elastic members 3A and 3B do not interfere with each other.

Further, each of the pair of elastic members 3A and 3B has a configuration in which two plate-shaped members are provided parallel to each other, whereby when the pair of elastic members 3A and 3B is elastically deformed, the pair of optical fibers 90A and 90B guided to the V-grooves 21 of the pair of V-grooved stands 2A and 2B connected to the pair of elastic members 3A and 3B moves substantially in parallel. Further, as shown in FIGS. 1 and 2, the pair of elastic members 3A and 3B is configured so as to be orthogonal to each other while being respectively inclined upward, thereby being disposed to be orthogonal to the movement in the X direction or the Y direction of the pair of right and left optical fibers 90A and 90B shown by the arrows in FIG. 3.

Then, the fusion splicer 1 is configured such that when viewed from the right and left end portions 4a and 4b of the fixed base 4, a distance L1 between one end portions 3a and 3a of the pair of elastic members 3A and 3B in the fixing base portions 41 is narrower than a distance L2 between the other end portions 3b and 3b on which the pair of V-grooved stands 2A and 2B is mounted. Here, in an example shown in FIG. 2, the distances L1 and L2 indicate, in one end portions 3a and 3a and the other end portions 3b and 3b of the pair of elastic members 3A and 3B each composed of two plate-shaped members, distances between the intermediate positions between joined portions of the two plate-shaped members.

In addition, the pair of elastic members 3A and 3B which is provided so as to extend upward while being inclined, as described above, can be configured so as to be fixed to the fixing base portions 41 of the fixed base 4 with the elastic member 3A and 3B inclined in directions orthogonal to each other, that is, directions intersecting at an angle of 90°.

The pair of micrometers 5 (5A and 5B) is for finely moving the pair of V-grooved stands 2A and 2B with respect to each other while elastically deforming the elastic members 3A and 3B, by pressing the pair of V-grooved stands 2A and 2B, more specifically, side walls 22a of the base portions 22 of the V-grooved stands 2A and 2B in the forward and backward directions.

As the micrometer 5, a micrometer which has been used for alignment of optical fibers in the relevant field in the past can be adopted without any limitation. For example, the micrometer 5 operates such that a tip 51 protrudes or is accommodated inside by a motor (not shown) provided in a main body 50, as in an illustrated example. Due to such an operation, the micrometer 5 aligns the tips 91a of the optical fibers 90A and 90B by appropriately moving the tips 91a of the optical fibers 90A and 90B accommodated in the V-grooves 21 of the V-grooved stands 2A and 2B by pressing and finely moving the side walls 22a of the base portions 22 of the V-grooved stands 2A and 2B, as described above.

The fiber clamps 6 are mounted so as to be movable with respect to the top base section 10 and are disposed to be separated from each other with the tips 91a of the pair of optical fibers 90A and 90B interposed therebetween in the right-left direction, that is, a direction parallel to the pair of optical fibers 90A and 90B, as described above. The fiber clamps 6 are provided so as to be able to move in the right-left direction with gripping each of the pair of optical fibers 90A and 90B, and respectively grip the pair of optical fibers 90A and 90B when fusion-splicing the tips 91a of the pair of optical fibers 90A and 90B.

Further, the fiber clamps 6 are a pair of right and left clamp members which includes a fiber clamp (not shown) gripping the optical fiber 90A on one side, and the fiber clamp 6B gripping the optical fiber 90B on the other side. Further, although detailed illustration is omitted, the fiber clamp 6 has a configuration capable of gripping (clamping) each of the pair of optical fibers 90A and 90B inserted therein, by a clamp which can be opened and closed by a biasing member such as a torsion coil spring or a double torsion spring, for example.

The pair of movable stages 7A and 7B is provided below the pair of fiber clamps 6 and is for driving the pair of fiber clamps 6 so as to approach each other or be separated from each other in the right-left direction, and for example, a motor, an electromagnet, a solenoid, or the like (none of which is shown) can be used as a drive source. Then, although detailed illustration is omitted, the pair of fiber clamps 6 described above is respectively fixed to the pair of movable stages 7A and 7B by using, for example, a bolt or the like.

The pair of fiber clamps 6 described above is made to be able to move so as to come close to or be separated from the V-grooves 21 of the pair of V-grooved stands 2A and 2B, which are disposed between the pair of fiber clamps 6, due to the pair of movable stages 7A and 7B moving so as to approach each other or be separated from each other for each of the pair of fiber clamps.

Further, in the fusion splicer 1 of the present embodiment, as shown in FIGS. 4A and 4B, each of the pair of movable stages 7A and 7B is disposed so as to be separated from each of the pair of V-grooved stands 2A and 2B disposed above the fixed base 4 at positions shifted in the right-left direction of the fixed base 4. In this manner, compact disposition is made without the pair of movable stages 7A and 7B and the pair of V-grooved stands 2A and 2B interfering with each other in the right-left direction of the fixed base 4.

The pair of illumination lamps for observation 8A and 8B is disposed on both sides of the tips 91a of the pair of optical fibers 90A and 90B brought into contact with each other between the pair of fiber clamps 6, on the lower side of the top base section 10, and emits observation light toward the tips 91a. As the illumination lamps for observation 8A and 8B, an illumination lamp made of a light-emitting element such as an LED, which has been used in the relevant field in the past, can be used without any limitation.

The pair of lenses for observation 9A and 9B is disposed to face the pair of illumination lamps for observation 8A and 8B on both sides of the tips 91a of the pair of optical fibers 90A and 90B brought into contact with each other between the pair of fiber clamps 6, on the lower side of the top base section 10. The lenses for observation 9A and 9B detect an alignment state of the tips 91a of the pair of optical fibers 90A and 90B brought into contact with each other, by incident light from the illumination lamps for observation 8A and 8B. Further, although detailed illustration is omitted, each of the pair of lenses for observation 9A and 9B is mounted on the fixed base 4 by means such as screwing.

Then, although illustration is omitted, the alignment state of the tips 91a of the pair of optical fibers 90A and 90B detected by the pair of lenses for observation 9A and 9B is input to a control section (not shown) as an alignment signal. The control section controls the rotation of a motor (not shown) provided in each of the pair of micrometers 5A and 5B by arithmetically processing the alignment signals from the pair of lenses for observation 9A and 9B, and thus adjusts the amount of protrusion of the tip 51. At this time, each of the pair of V-grooved stands 2A and 2B is appropriately finely moved in the X direction or the Y direction shown by the arrows in FIG. 2 by appropriately controlling the amount of protrusion of the tip 51 in each of the pair of micrometers 5A and 5B (also refer to FIG. 3). In this manner, the tips 91a of the pair of optical fibers 90A and 90B set in the respective V-grooves 21 of the pair of V-grooved stands 2A and 2B are aligned with a high degree of accuracy.

The pair of electrode rods 15A and 15B is electrode members which are disposed to be separated from each other so as to face each other on both sides of the tips 91a of the pair of optical fibers 90A and 90B brought into contact with each other between the pair of fiber clamps 6, and discharge-heats the tips 91a. The electrode rods 15A and 15B are disposed so as to face each other in the front to back direction, that is, in the direction orthogonal to the pair of optical fibers 90A and 90B with tips 15a separated from the tips 91a of the pair of optical fibers 90A and 90B by a predetermined distance. Further, each of the tips 15a of the pair of electrode rods 15A and 15B has a tapered shape. The fusion splicer 1 performs fusion by heating the tips 91a of the pair of optical fibers 90A and 90B by discharge heating by the pair of electrode rods 15A and 15B.

The top base section 10 is a member which is provided so as to cover at least part of the pair of V-grooved stands 2A and 2B, the pair of elastic members 3A and 3B, the fixed base 4, and the micrometers 5 from above, as described above, and formed of a resin material or the like into the form of a flat plate. In the top base section 10 of an example shown in FIG. 5, a hole portion 10A is open, whereby the V-grooves 21 of the pair of V-grooved stands 2A and 2B are exposed from above. Further, the lid portion 11 is provided on the top base section 10, and although illustration is omitted, the lid portion 11 is mounted on the top base section 10 so as to be able to be opened and closed by, for example, a hinge member or the like.

Further, on the top base section 10, the mounting boss 12 for fixing the fixed base 4 is provided so as to protrude downward. The mounting boss 12 is formed into the form of a truncated cone, the diameter of which is reduced toward the lower side, and a bolt mounting hole (not shown) is provided in the tip face 12a. Then, the bolt 13 is screwed into the bolt mounting hole, whereby the pair of mounting portions 42A and 42B provided in the fixed base 4 is fixed to the mounting bosses 12 by the bolts 13. In this manner, the fixed base 4 is mounted on the top base section 10.

The fusion splicer 1 of the present embodiment is provided with each configuration described above, whereby very excellent effects in which it is possible to reduce the size and the weight of the entire elastic alignment mechanism such as the V-grooved stand or the fixed base while suppressing occurrence of distortion in the fixed base to which the elastic member is connected, and maintenance work becomes easy, are obtained. Hereinafter, the operation and effects which are obtained by the fusion splicer 1 of the present embodiment will be described in comparison with the case of the fusion splicer having the configuration of the related art.

Figure 9:
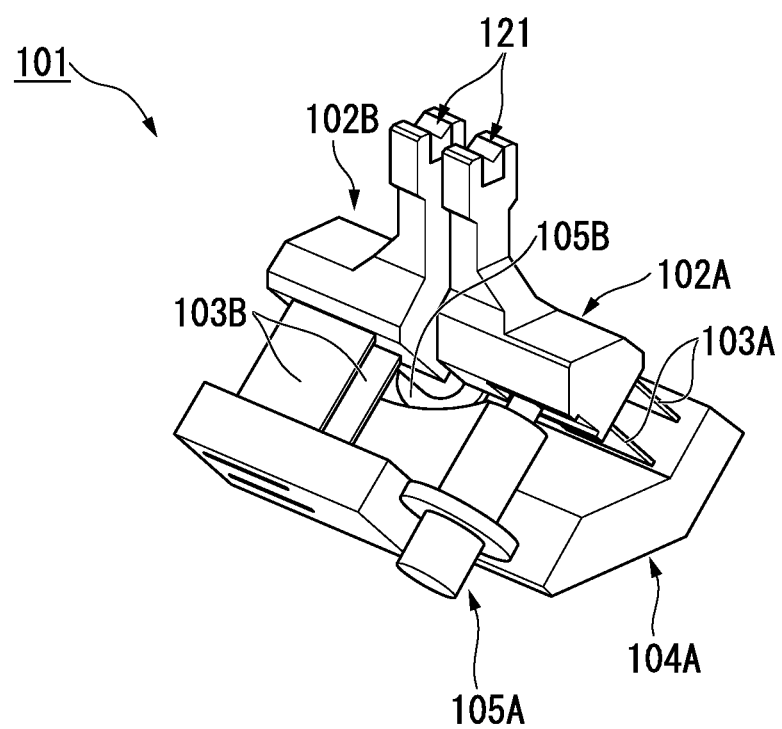
FIG. 9 is a perspective view showing an elastic alignment mechanism of an optical fiber fusion splicer with which the optical fiber fusion splicing apparatus of the related art is provided.
Figure 10:
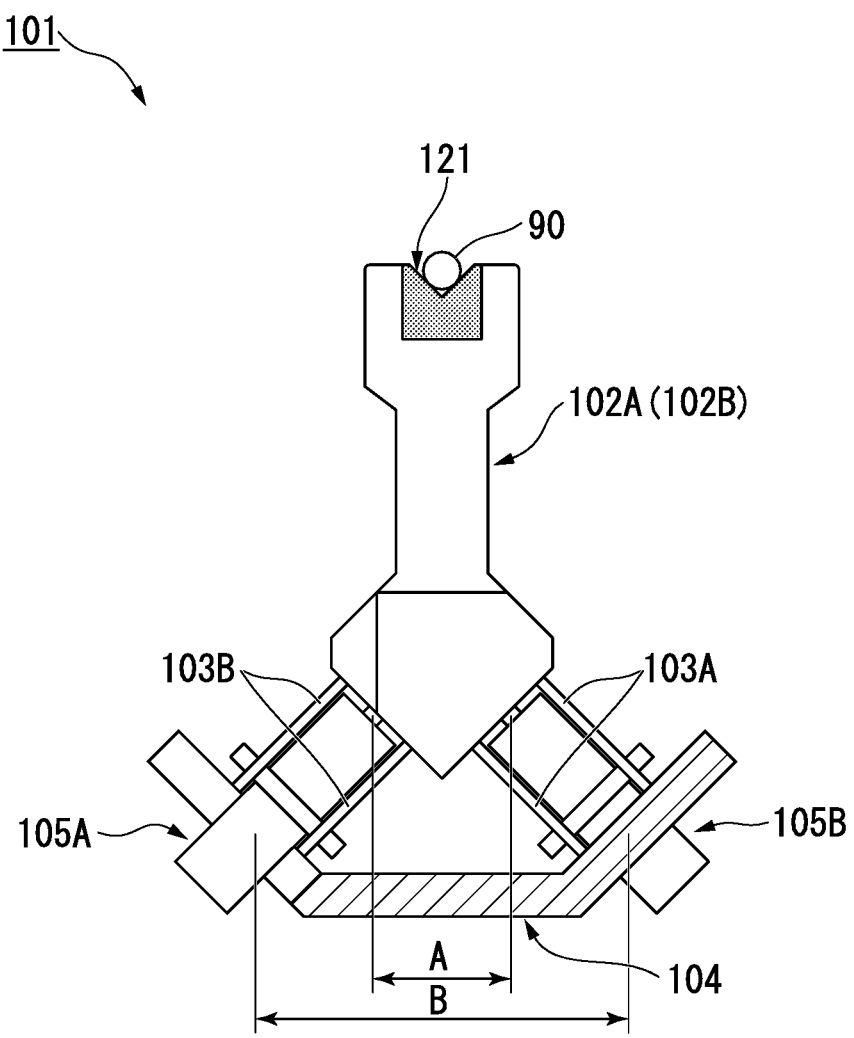
FIG. 10 is a side view showing the elastic alignment mechanism of the optical fiber fusion splicer with which the optical fiber fusion splicing apparatus of the related art is provided.

First, in the fusion splicer (the elastic alignment mechanism) having the configuration of the related art as shown in FIGS. 9 and 10, the distance B between the connection portions of the pair of elastic members 103A and 103B to the fixed base 104 is large, and therefore, when deforming the elastic member 103A by the micrometer 105A, distortion occurs in the fixed base 104, and thus there is a concern that the fixed base 104 may be damaged or alignment accuracy may be reduced.

In contrast, according to the fusion splicer 1 of the present embodiment, due to the configuration in which the distance L1 between one end portions 3a and 3a of the pair of elastic members 3A and 3B in the fixed base 4 is short, it is possible to reduce the size of the fixed base 4, and therefore, occurrence of distortion in the fixed base 4 can be suppressed. Therefore, breakage of the optical fiber fusion splicer or a decrease in alignment accuracy of the pair of optical fibers 90A and 90B can be prevented and it becomes possible to attain a reduction in the size and the weight of the entire optical fiber fusion splicing apparatus.

Further, in the case of the fusion splicer having the configuration of the related art, since the distance B between the connection portions of the pair of elastic members 103A and 103B to the fixed base 104 is larger than the distance A between the connection portions of the pair of elastic members 103A and 103B to the pair of V-grooved stands 102A and 102B, there is a problem in that the size of the fixed base 104 increases and the weight also increases. In addition, the fusion splicer of the related art has a configuration in which the pair of V-grooved stands 102A and 102B extends up and down in order to avoid the lenses for observation 109 (not shown), or guides (not shown) for driving forward the fiber clamps 106A and 106B (refer to FIG. 8), and therefore, there is also a problem in that the height of the entire mechanism is increased.

In contrast, in the fusion splicer 1 of the present embodiment, a configuration is adopted in which the pair of elastic members 3A and 3B is fixed so as to extend upward from the fixed base 4 while being inclined in the forward and backward directions and is disposed at positions shifted in the right-left direction and the connection portions of the pair of V-grooved stands 2A and 2B to the pair of elastic members 3A and 3b are disposed at positions away from a fusion splicing portion in which the tips 91a of the pair of optical fibers 90A and 90B are brought into contact with each other. In this manner, there is no interference with the pair of right and left fiber clamps 6, the pair of movable stages 7A and 7B driving forward the fiber clamps 6, or the like, and therefore, it is not necessary to increase the height of the pair of V-grooved stands 2A and 2B, and thus it becomes possible to reduce the height of the fusion splicer 1. Therefore, a reduction in the size and the weight of the entire optical fiber fusion splicing apparatus become possible.

Further, in the fusion splicer of the related art, the connection portions of the elastic members 103A and 103B to the V-grooved stands 102A and 102B are disposed in the vicinity of a fusion splicing portion between the pair of optical fibers 90A and 90B, and therefore, there is also a case where the pair of elastic members 103A and 103B interfere with the fiber clamps 106A and 106B (refer to FIG. 8) or driving stages for driving forward the fiber clamps 106A and 106B. In order to avoid such interference, it is necessary to dispose the V-grooves 121 on the upper side and dispose the elastic members 103A and 103B on the lower side of the apparatus. However, in this case, a drive mechanism such as the micrometer 105A is disposed on the lower side of the apparatus, and therefore, there is also an concern in that it is difficult to perform maintenance work from above the apparatus.

In contrast, the fusion splicer 1 of the present embodiment has a configuration in which the pair of elastic members 3A and 3B is fixed so as to extend upward while being inclined in the forward and backward directions and is disposed at positions shifted in the right-left direction, and therefore, drive mechanisms such as the pair of micrometers 5A and 5B for elastically deforming the pair of elastic members 3A and 3B can be disposed on the upper side, backward and forward away from a fusion splicing portion. In this manner, it becomes easy to perform maintenance work of the drive mechanisms from above the optical fiber fusion splicing apparatus, and therefore, both effects of a reduction in the size of the apparatus and improvement in maintainability are obtained.

Figure 11:
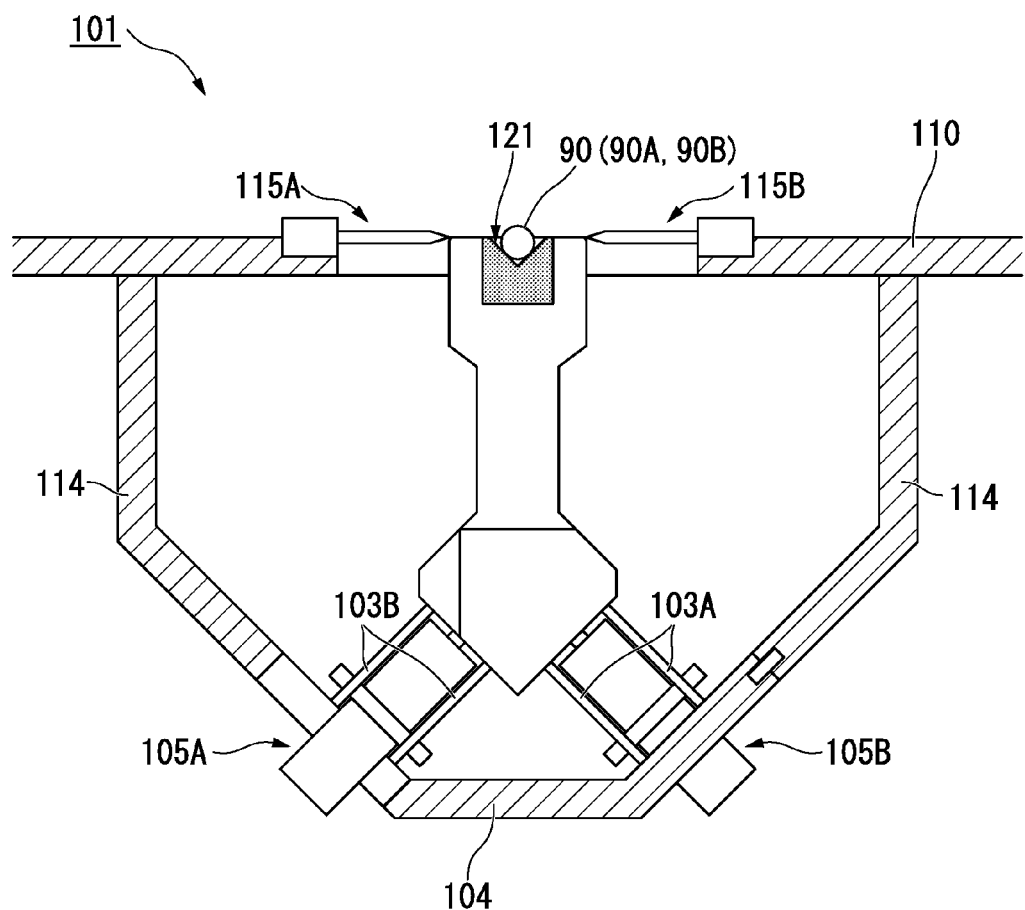
FIG. 11 is a side view describing the positional relationship between the elastic alignment mechanism and a top base and the mounting form of the elastic alignment mechanism in the optical fiber fusion splicer with which the optical fiber fusion splicing apparatus of the related art is provided.

Here, in the fusion splicer of the related art, as shown in FIG. 11, the fixed base 104 is mounted on a top base 110 by a suspension member 114 and a screw member (not shown), and although illustration is omitted in FIG. 11, a structure is made in which lenses for observation which are provided in a pair are also mounted on the top base 110 by screwing or the like. However, in the case of such a configuration, there is a problem in terms of impact resistance, such as there being a concern that, for example, in a case where the optical fiber fusion splicing apparatus is dropped, or the like, a large impact may be particularly transmitted to lenses for observation, thereby damaging the lenses for observation.

In contrast, in the fusion splicer 1 of the present embodiment, due to the configuration shown in FIGS. 1 and 2, it is possible to reduce a height, and therefore, it becomes possible to further optimize a disposition form in the optical fiber fusion splicing apparatus. That is, rather than mounting the lens for observation on the top base section, as in the configuration of the related art, for example, in an example shown in FIG. 5, it becomes possible to adopt a configuration in which the pair of lenses for observation 9A and 9B is mounted and supported on the fixed base 4. In a case of adopting such a configuration, compared to a case where a lens for observation is directly mounted on a top base section, an impact is hardly transmitted to the pair of lenses for observation 9A and 9B which is delicate, and thus the effect that impact resistance is improved is obtained.

Next, the procedure of fusion-splicing the tips 91a of the pair of optical fibers 90A and 90B as shown in FIG. 3 by using the fusion splicer 1 having the configuration described above will be described.

First, the pair of optical fibers 90A and 90B is set in the V-grooves 21 respectively provided in the pair of V-grooved stands 2A and 2B such that the tips 91a roughly face each other is created. At this time, clamp members (not shown) provided in the pair of fiber clamps 6 are in an open state, and a state where the pair of optical fibers 90A and 90B is placed in the opened clamp members is created.

Subsequently, a state is created where the pair of optical fibers 90A and 90B is gripped by closing the clamp members provided in the pair of fiber clamps 6.

Thereafter, the lid portion 11 is closed, and the fusion splicer 1 is operated by operating the operation section (not shown), whereby the tips 91a of the pair of optical fibers 90A and 90B are fusion-spliced to each other.

At this time, the pair of fiber clamps 6 moves toward the sides of the V-grooves 21 provided in the pair of V-grooved stands 2A and 2B according to the movement of the pair of movable stages 7A and 7B, whereby the tips 91a slide in the V-grooves 21, thereby being disposed in a state of facing each other. Further, the alignment state of the tips 91a at this time is detected by the pair of lenses for observation 9A and 9B disposed to face the pair of illumination lamps for observation 8A and 8B and an alignment signal is input to the control section (not shown). The control section arithmetically processes the input alignment signal, as described above, and appropriately controls the amount of protrusion of the tip 51 while controlling the rotation of the motor (not shown) provided in each of the pair of micrometers 5A and 5B, thereby finely moving each of the pair of V-grooved stands 2A and 2B in the X direction or the Y direction shown by the arrows in FIG. 2. In this manner, the tips 91a of the pair of optical fibers 90A and 90B set in the V-grooves 21 are aligned.

Then, electric discharge is performed toward the tips 91a aligned to face each other between the tips 15a of the pair of electrode rods 15A and 15B, whereby the tips 91a are heated and melted, thereby being fused.

The pair of optical fibers 90A and 90B is fusion-spliced to each other by the above procedure.

Second Embodiment

Hereinafter, an optical fiber fusion splicer 1A of a second embodiment of the present invention will be described mainly referring to FIGS. 6 and 7. In addition, in the present embodiment, a portion is described with reference to the same drawings as those in the first embodiment described above, and a common configuration described previously, for example, the pair of micrometers 5 which aligns the tips 91a of the pair of optical fibers 90A and 90B while elastically deforming the elastic members by pressing the V-grooved stands, or the like is denoted by the same reference numeral and the detailed description thereof is omitted.

Figure 6:
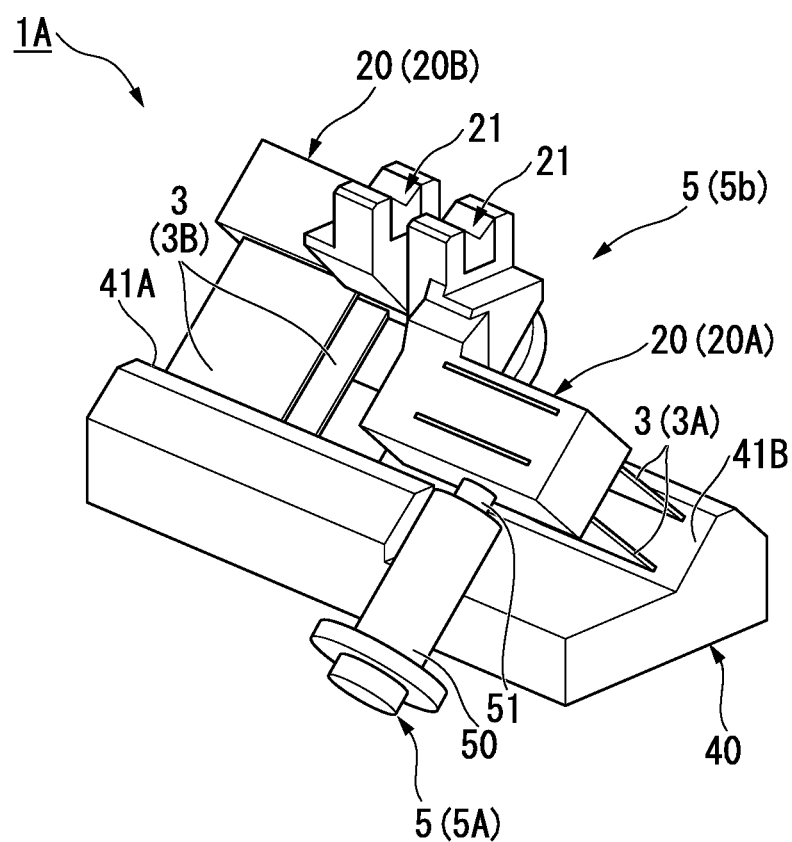
FIG. 6 is a perspective view showing an elastic alignment mechanism of an optical fiber fusion splicer with which an optical fiber fusion splicing apparatus according to another embodiment of the present invention is provided.
Figure 7:
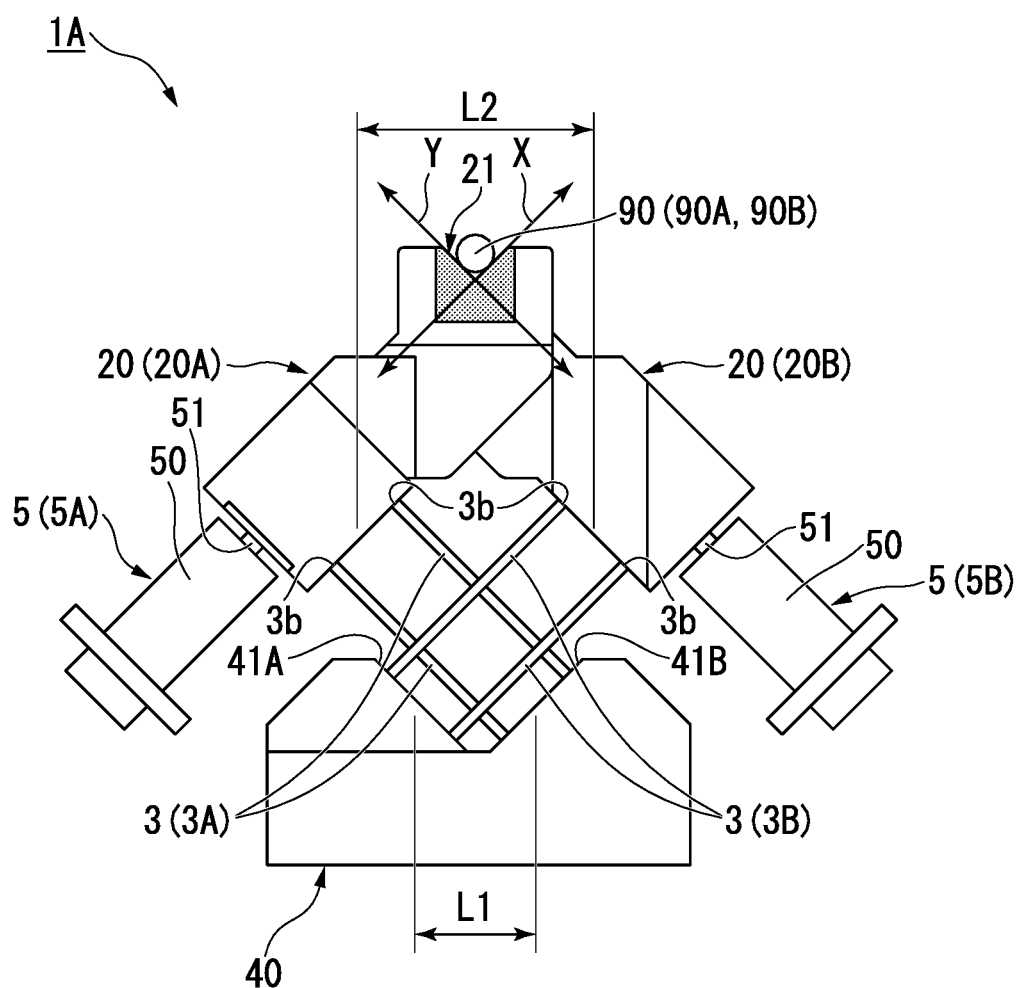
FIG. 7 is a side view showing the elastic alignment mechanism of the optical fiber fusion splicer with which the optical fiber fusion splicing apparatus according to another embodiment of the present invention is provided.

As shown in FIGS. 6 and 7 (FIG. 3 is also referred to), the fusion splicer 1A of the present embodiment is for aligning the tips 91a of the pair of optical fibers 90A and 90B, thereby bringing the tips 91a into contact with each other, and fusion-splicing the core wires of the pair of optical fibers by discharge heating, similar to the fusion splicer 1 of the first embodiment.

The fusion splicer 1A is provided with a pair of right and left V-grooved stands 20A and 20B having the V-grooves 21 for bringing the tips 91a of the pair of optical fibers 90A and 90B into contact with each other while positioning the tips 91a, the pair of elastic members 3A and 3B respectively supporting the pair of V-grooved stands 20A and 20B and formed into the form of an elastically deformable plate, and a fixed base 40 on which the pair of elastic members 3A and 3B is mounted, whereby the pair of V-grooved stands 20A and 20B is fixed thereto through the pair of elastic members 3A and 3B, and which is long in the right-left direction. Further, the fusion splicer 1A is provided with the pair of micrometers 5A and 5B for aligning the tips 91a of the pair of optical fibers 90A and 90B by finely moving the pair of V-grooved stands 20A and 20B while elastically deforming the pair of elastic members 3A and 3B by pressing the pair of V-grooved stands 20A and 20B from the forward and backward directions. In addition, the fusion splicer 1A is roughly common to the fusion splicer 1 of the first embodiment described above in that the pair of V-grooved stands 20A and 20B is disposed such that the V-grooves 21 respectively provided in the V-grooved stands 20A and 20B communicate with each other and the fusion splicer 1A has each of these configurations.

Here, the fusion splicer 1A of the present embodiment has a configuration which is different from that of the fusion splicer 1 of the first embodiment shown in FIGS. 1, 2 and the like in that a pair of fixing base portions 41A and 41B disposed parallel to each other in the right-left direction is provided in the fixed base 40 and the pair of elastic members 3A and 3B is provided so as to extend upward from the pair of fixing base portions 41A and 41B provided in the fixed base 40, while intersecting each other and being inclined in the forward and backward directions, and is disposed at positions shifted in the right-left direction of the fixed base 40, as shown in FIGS. 6 and 7.

Then, in the fusion splicer 1A, similar to the fusion splicer 1 of the first embodiment, a configuration is made such that when viewed from the left and right end portions 40a and 40b of the fixed base 40, the distance L1 between one end portions 3a and 3a of the pair of elastic members 3A and 3B in the pair of fixing base portions 41A and 41B is narrower than the distance L2 between the other end portions 3b and 3b on which the pair of V-grooved stands 20A and 20B is mounted.

That is, the fusion splicer 1A of the present embodiment is greatly different from the fusion splicer 1 of the first embodiment shown in FIGS. 1 and 2 and the like in that the pair of elastic members 3A and 3B supporting the pair of V-grooved stands 20a and 20B is disposed so as to cross each other, as shown in the side view of FIG. 7.

On the other hand, the fusion splicer 1A has a configuration in which the pair of elastic members 3A and 3B is fixed so as to extend upward from the fixed base 40 while being inclined in the forward and backward directions and is disposed at positions shifted in the right-left direction, similar to the fusion splicer 1 of the first embodiment. In this manner, similar to the case of the first embodiment, the pair of elastic members 3A and 3B does not interfere with the pair of right and left fiber clamps 6, the pair of movable stages 7A and 7B, or the like, and therefore, it is not necessary to increase the height of the pair of V-grooved stands 20A and 20B. Therefore, it is possible to reduce the height of the fusion splicer 1A, and thus a reduction in the size and the weight of the entire optical fiber fusion splicing apparatus becomes possible.

Further, similar to the first embodiment, the distance L1 between one end portions 3a and 3a, that is, the connection portions, of the pair of elastic members 3A and 3B in the fixed base 40 is configured to be short, whereby it becomes possible to reduce the size of the fixed base 40. In this manner, as described above, occurrence of distortion in the fixed base 40 can be suppressed, and therefore, breakage of the optical fiber fusion splicer or a decrease in alignment accuracy of the pair of optical fibers 90A and 90B can be prevented, and it becomes possible to attain a reduction in the size and the weight of the entire optical fiber fusion splicing apparatus.

In addition, similar to the first embodiment, the pair of elastic members 3A and 3B is disposed so as to extend upward while being inclined in the forward and backward directions and at positions shifted in the right-left direction, and therefore, the drive mechanisms such as the pair of micrometers 5A and 5B can be disposed on the upper side, backward and forward away from a fusion splicing portion. In this manner, as described above, it becomes easy to perform maintenance word of each drive mechanism from above the optical fiber fusion splicing apparatus, and thus both effects of a reduction in the size of the apparatus and improvement in maintainability are obtained.

[Other Modified Examples of Optical Fiber Fusion Splicer]

The optical fiber fusion splicing apparatus according to the present invention is not limited to the optical fiber fusion splicing apparatus which is provided with the fusion splicer 1 or 1A having the configuration described in each of the embodiments described above, and it is possible to apply various changes and additions without departing from the scope described in the appended claims of the present invention.

For example, in the fusion splicer 1 or 1A of each embodiment, as the pair of micrometers 5A and 5B for performing alignment of the tips 91a of the pair of optical fibers 90A and 90B by pressing the pair of V-grooved stands, in terms of being able to further reduce the size of the entire fusion splicer, it is preferable to adopt, for example, a micrometer reduced in size including a drive mechanism such as a motor.

Further, in the optical fiber fusion splicing apparatus according to the present invention, in relation to the alignment of the tips 91a of the pair of optical fibers 90A and 90B as described above, instead of core alignment as having been performed in the past, the alignment may be performed by alignment of an outer diameter including a clad. In such a case, it is possible to make an optical component for performing the alignment of the tips 91a be a simple and small component, and thus it becomes possible to further reduce the size and the weight of the fusion splicer.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical fiber fusion splicer which aligns tips of a pair of optical fibers and butts the tips each other, and fusion-splices core wires of the pair of optical fibers by discharge heating, comprising:
   a pair of right and left V-grooved stands comprising V-grooves for butting the tips of the pair of optical fibers each other while positioning the tips of the pair of optical fibers;
   a pair of elastic members respectively supporting the pair of V-grooved stands, each of the elastic members comprising two elastically deformable plate-shaped members provided parallel to each other;
   a fixed base on which the pair of elastic members is mounted, whereby the pair of V-grooved stands is fixed thereto through the pair of elastic members, and which is long in a right-left direction; and
   a pair of micrometers aligning the tips of the pair of optical fibers by finely moving the pair of V-grooved stands with respect to each other while elastically deforming the pair of elastic members by pressing the pair of V-grooved stands from forward and backward directions, wherein:
   the pair of elastic members is provided so as to extend upward from fixing base portions of the fixed base while being respectively inclined in the forward and backward directions, and is disposed at positions shifted in the right-left direction of the fixed base;
   the pair of V-grooved stands is disposed such that the V-grooves provided therein communicate with each other; and
   when viewed from the right and left end portions of the fixed base, a distance L1 between first end portions of the pair of elastic members fixed to the fixing base portions is narrower than a distance L2 between second end portions of the pair of elastic members on which the pair of V-grooved stands is mounted.

2. An optical fiber fusion splicer which aligns tips of a pair of optical fibers and butts the tips each other, and fusion-splices core wires of the pair of optical fibers by discharge heating, comprising:
   a pair of right and left V-grooved stands comprising V-grooves for butting the tips of the pair of optical fibers each other while positioning the tips of the pair of optical fibers;
   a pair of elastic members respectively supporting the pair of V-grooved stands, each of the elastic members comprising two elastically deformable plate-shaped members provided parallel to each other;
   a fixed base on which the pair of elastic members is mounted, whereby the pair of V-grooved stands is fixed thereto through the pair of elastic members, and which is long in a right-left direction; and
   a pair of micrometers aligning the tips of the pair of optical fibers by finely moving the pair of V-grooved stands with respect to each other while elastically deforming the pair of elastic members by pressing the pair of V-grooved stands from forward and backward directions, wherein:
   the fixed base is provided with a pair of fixing base portions disposed parallel to each other in the right-left direction;
   the pair of elastic members is provided so as to extend upward from the pair of fixing base portions provided in the fixed base, while intersecting each other and being inclined in forward and backward directions, and is disposed at positions shifted in the right-left direction of the fixed base;
   the pair of V-grooved stands is disposed such that the V-grooves provided therein communicate with each other; and
   when viewed from the right and left end portions of the fixed base, a distance L1 between first end portions of the pair of elastic members fixed to the pair of fixing base portions is narrower than a distance L2 between second end portions of the pair of elastic members on which the pair of V-grooved stands is mounted.

3. The optical fiber fusion splicer according to claim 1, wherein the pair of elastic members is fixed to the fixed base with the elastic members inclined in directions orthogonal to each other.

4. The optical fiber fusion splicer according to claim 2, wherein the pair of elastic members is fixed to the fixed base with the elastic members inclined in directions orthogonal to each other.

5. The optical fiber fusion splicer according to claim 1, further comprising:
   a top base section which is provided so as to cover at least part of the pair of V-grooved stands, the pair of elastic members, the fixed base, and the micrometers from above;
   a pair of fiber clamps which is mounted on the top base section, disposed to be separated from each other with the tips of the pair of optical fibers interposed therebetween in the right-left direction, and provided so as to be able to move in the right-left direction with gripping each of the pair of optical fibers;
   a pair of movable stages which is provided below the pair of fiber clamps and makes the pair of fiber clamps approach each other or be separated from each other in the right-left direction;
   a pair of illumination lamps for observation which is disposed on both sides of the tips of the pair of optical fibers on an upper side of the top base section, and emits observation light toward the tips;
   a pair of lenses for observation which is mounted on the fixed base so as to be disposed to face the pair of illumination lamps for observation on both sides of the tips of the pair of optical fibers on the lower side of the top base section, and detects an alignment state of the tips of the pair of optical fibers brought into contact with each other, by incident light from the illumination lamps for observation; and
   a pair of electrode rods which is disposed to be separated from each other so as to face each other on both sides of the tips of the pair of optical fibers which are butt each other between the pair of fiber clamps, and discharge-heats the tips of the pair of optical fibers,
   wherein the fixed base is fixed to a mounting boss provided so as to protrude downward from the top base section.

6. The optical fiber fusion splicer according to claim 2, further comprising:

a top base section which is provided so as to cover at least part of the pair of V-grooved stands, the pair of elastic members, the fixed base, and the micrometers from above;

a pair of fiber clamps which is mounted on the top base section, disposed to be separated from each other with the tips of the pair of optical fibers interposed therebetween in the right-left direction, and provided so as to be able to move in the right-left direction with gripping each of the pair of optical fibers;

a pair of movable stages which is provided below the pair of fiber clamps and makes the pair of fiber clamps approach each other or be separated from each other in the right-left direction;

a pair of illumination lamps for observation which is disposed on both sides of the tips of the pair of optical fibers on an upper side of the top base section, and emits observation light toward the tips;

a pair of lenses for observation which is mounted on the fixed base so as to be disposed to face the pair of illumination lamps for observation on both sides of the tips of the pair of optical fibers on the lower side of the top base section, and detects an alignment state of the tips of the pair of optical fibers brought into contact with each other, by incident light from the illumination lamps for observation; and a pair of electrode rods which is disposed to be separated from each other so as to face each other on both sides of the tips of the pair of optical fibers which are butt each other between the pair of fiber clamps, and discharge-heats the tips of the pair of optical fibers, wherein the fixed base is fixed to a mounting boss provided so as to protrude downward from the top base section.

7. The optical fiber fusion splicer according to claim 5, wherein the pair of movable stages is disposed above the fixed base so as to be respectively separated from the pair of V-grooved stands disposed at positions shifted in the right-left direction of the fixed base.

8. The optical fiber fusion splicer according to claim 6, wherein the pair of movable stages is disposed above the fixed base so as to be respectively separated from the pair of V-grooved stands disposed at positions shifted in the right-left direction of the fixed base.

9. An optical fiber fusion splicing apparatus comprising the optical fiber fusion splicer according to claim 1.

10. An optical fiber fusion splicing apparatus comprising the optical fiber fusion splicer according to claim 2.

* * * * *